Feb. 23, 1937.  B. R. WELLINGTON  2,071,444
RANGE FINDER
Filed Sept. 10, 1935   3 Sheets-Sheet 1
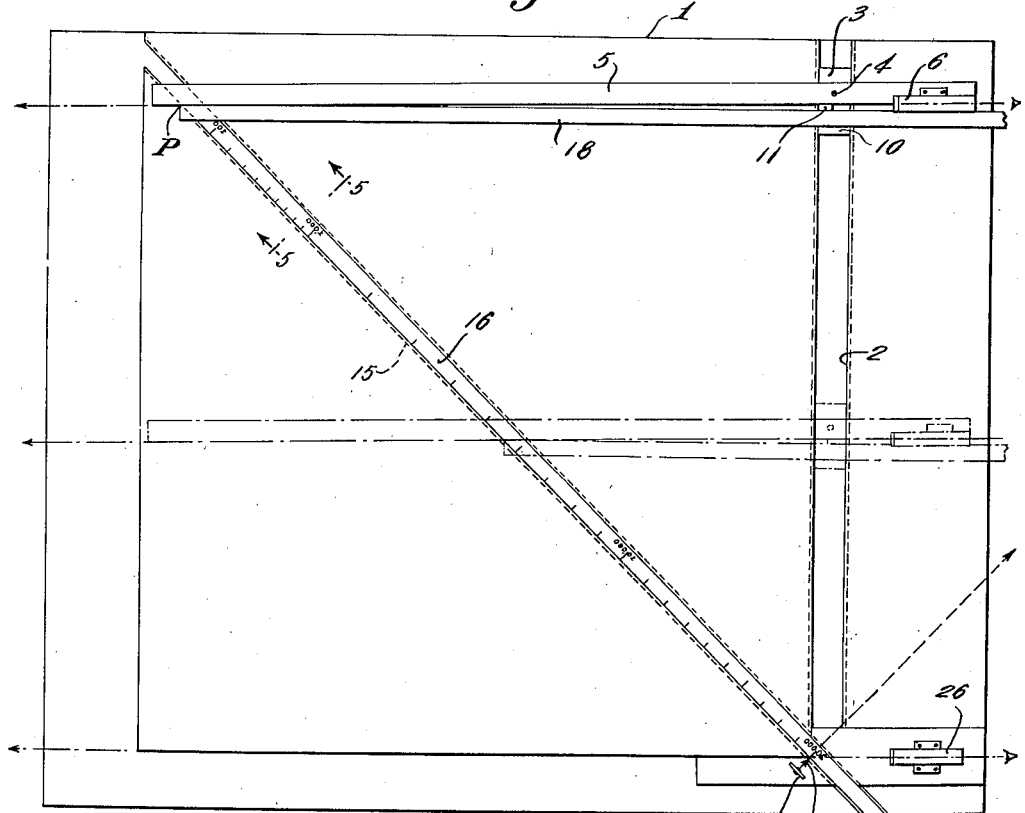
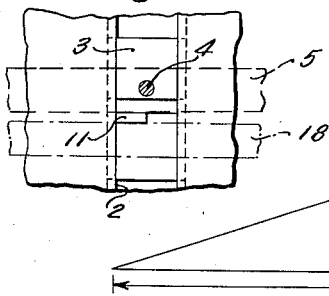
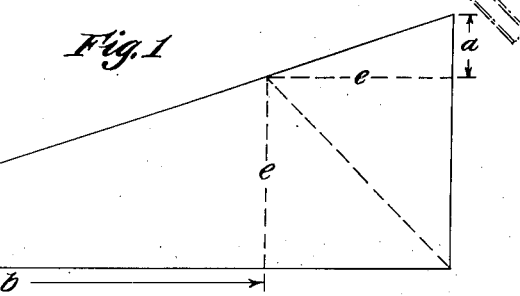
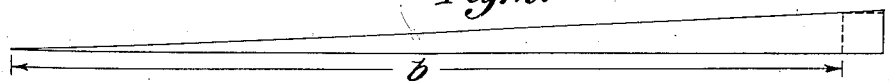
Inventor,
Barrett R. Wellington,
by Roberts, Cushman & Woodberry
Attys.

Feb. 23, 1937.  B. R. WELLINGTON  2,071,444
RANGE FINDER
Filed Sept. 10, 1935   3 Sheets-Sheet 2
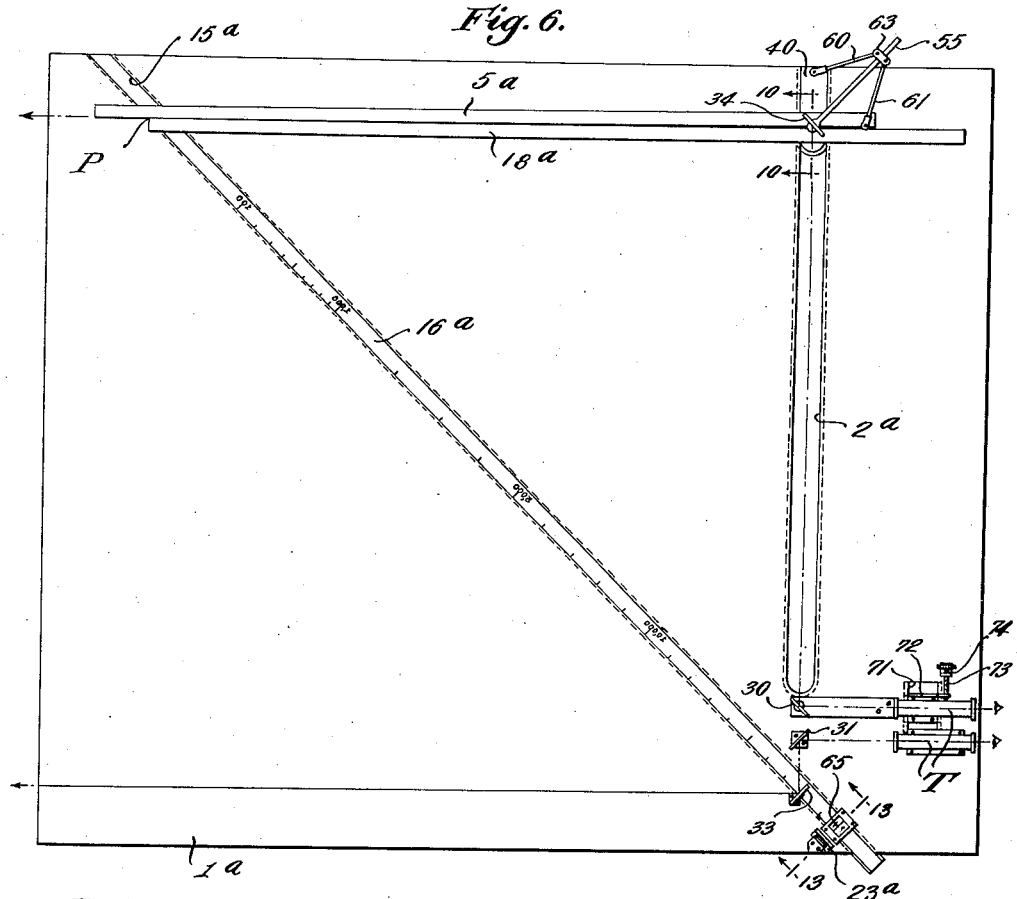
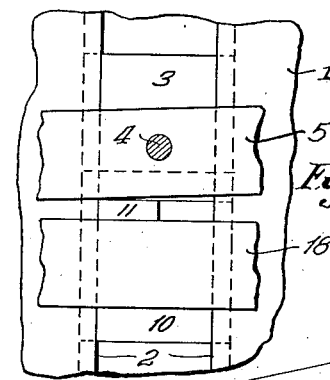
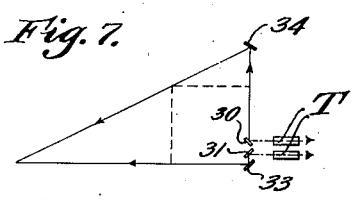
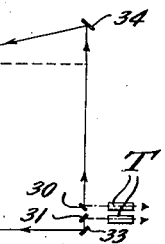
Inventor,
Barrett R. Wellington,
by Roberts, Cushman & Woodberry
Attys.

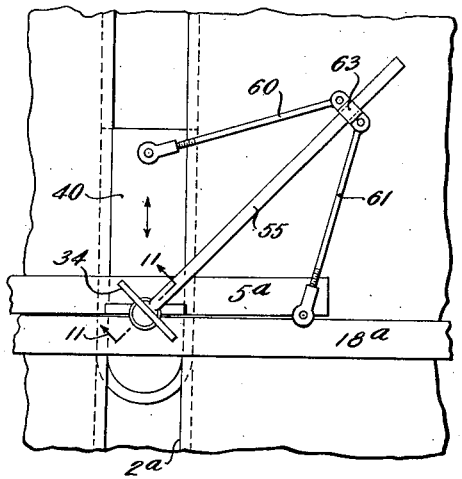
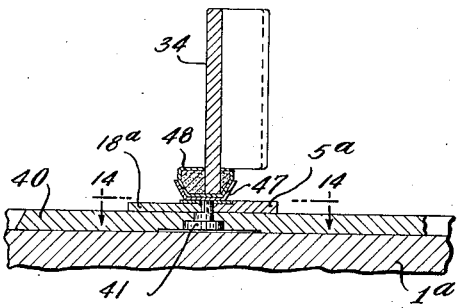
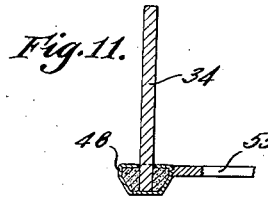
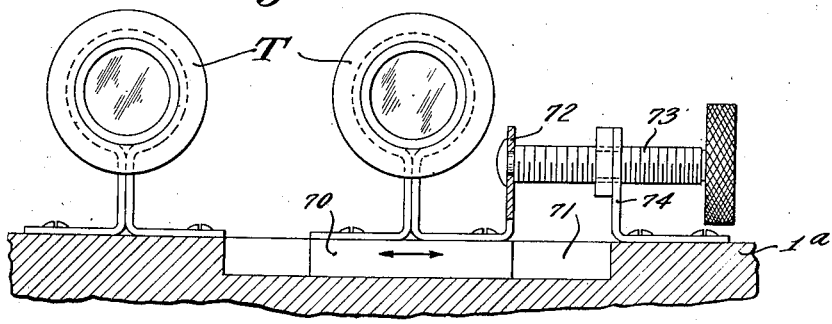
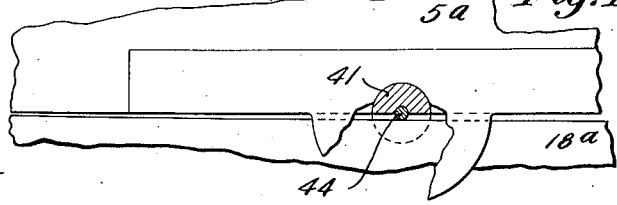
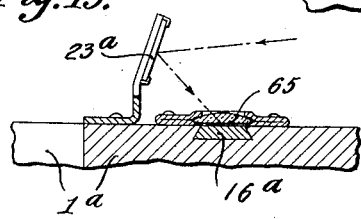

Patented Feb. 23, 1937

2,071,444

UNITED STATES PATENT OFFICE 2,071,444

RANGE FINDER

Barrett R. Wellington, Troy, N. Y.

Application September 10, 1935, Serial No. 39,921

10 Claims. (Cl. 88—2.7)

This invention relates to improved types of range finders and particularly to such devices which may be particularly accurate, simple and convenient to operate. In accordance with this invention the range finder is provided with a comparatively long scale which preferably may be diagonally arranged so that a more accurate reading is afforded. The scale may be directly calibrated to afford immediate readings of distances or, if preferred, it may be calibrated to give readings corresponding to elevations of guns of a given type or the like.

Range finders constructed in accordance with this invention operate on a geometrical principle which involves the provision of a movable angle assembly that defines the diagonal and a side of a theoretical square of variable size, the angle assembly having a point of contact with a swinging hypotenuse member which is disposed along one line of sight. The second line of sight may extend along a fixed side of the theoretical square. The hypotenuse member extends along the hypotenuse of an imaginary large right triangle, the hypotenuse and longer leg of which converge at the object being sighted. The theoretical square is inscribed in this large triangle with one of its corners coinciding with the right angle of the triangle and with its diagonally opposite corner at the point of contact of the angle assembly and hypotenuse. Thus a geometrical lay-out or theoretical figure is provided consisting of a large right triangle and an inscribed square, the sides of the square cooperating with portions of the hypotenuse and the legs of the large triangle in defining two smaller right triangles, these two smaller triangles each being similar to each other and to the larger right triangle.

In accordance with this invention, one side of the smallest triangle may preferably be given a constant dimension which is accurately determined by a spacer or the like on the range finder, while the angle assembly may be adjusted along a diagonal guideway so that the point of contact of the assembly and the hypotenuse is varied depending upon the angular position of the hypotenuse, thus the small triangle, one leg of which is provided by the spacer has its other leg and its hypotenuse variable in length in accordance with the variable lengths of the corresponding parts of the large triangle the hypotenuse and longer leg of which converge at the object being sighted.

A directly readable scale may be provided to give an indication of the distance of the object. In order to permit wider spacing of the graduations of such a scale and thus greater accuracy in the readings afforded thereby, the scale is preferably associated with the diagonal member of the angle assembly.

In accordance with one aspect of this invention, the range finder may be provided with stereoscopic telescopes which are associated with suitable mirrors, one of which may be movable so that the parts of the range finder may be adjusted until the images viewed through the telescopes coincide thus indicating that the parts of the range finder are properly located so that the lines of sight meet at the object.

In the accompanying drawings:

Fig. 1 is a diagrammatic view illustrating the principles of the present invention;

Fig. 2 is a similar view;

Fig. 3 is a plan view of a range finder constructed in accordance with the present invention;

Fig. 4 is an enlarged detail view partly in plan and partly in section;

Fig. 5 is a section on the line 5—5 of Fig. 3;

Fig. 6 is a plan view of an optional form of range finder provided with stereoscopic telescopes;

Figs. 7 and 8 are diagrammatic views illustrating the general principle of operation of the range finder of Fig. 6;

Fig. 9 is a detail view showing a portion of the range finder of Fig. 6 in plan;

Fig. 10 is a sectional detail indicated by lines 10—10 of Fig. 6 but on a larger scale;

Fig. 11 is a section on the line 11—11 of Fig. 9 on an enlarged scale;

Fig. 12 is a view partly in elevation and partly in section showing the arrangement of stereoscopic telescopes;

Fig. 13 is a section indicated by line 13—13 of Fig. 6;

Fig. 14 is a section indicated by line 14—14 of Fig. 10, parts being broken away and shown in plan; and Fig. 15 is a detailed plan view of the assembly shown in Fig. 4 with the angular position of the hypotenuse somewhat exaggerated for clarity of illustration.

First referring to Fig. 1 of the accompanying drawings, a large right triangle is shown with an inscribed square having sides e indicated by dotted lines which meet at a corner contacting the hypotenuse of the large triangle, while the diagonally opposite corner of this square coincides with the corner of the large triangle. It is thus evident that a figure is provided consisting of the large triangle, the square and two smaller right triangles which are similar to each other and similar to the large triangle. Thus the shorter leg $a$ of the smallest triangle has the same ratio to the longer leg $e$ of that triangle as the shorter leg $e$ of the triangle of intermediate size has to the base or longer leg $b$ thereof. In other words $$\frac{a}{e}=\frac{e}{b}$$

In accordance with the principles of this invention the dimension of the shorter leg of the small triangle may have a determined fixed dimension of small size such as 1/32, 1/50 or 1/100 of an inch or similar smaller fractions of a foot or yard. At any given setting of the device the point of contact of the square and hypotenuse is known so that the dimension $e$ is also known. Accordingly the above equation may be solved for the value of $b$ since $ab=e^2$ and both $a$ and $e$ are known.

In actual use the large triangle defined by my range finder will commonly have one very acute angle and the square may have a side nearly as long as the shorter leg of the large triangle, the approximate shape of the figure thus provided being shown in Fig. 2 it being evident that the shorter leg of the smallest triangle has a very small constant dimension.

Fig. 3 illustrates one concrete embodiment of the invention which is constructed in accordance with the geometrical principles discussed with reference to Fig. 1. The range finder is provided with a frame or board 1 having a rectilinear guideway 2 in which a slider 3 may be mounted. Preferably, for example, the guide 2 may be in the form of a groove with undercut side walls and the slider 3 may be of dovetailed construction to interfit with the groove. The slider 3 is provided with a pivot pin 4 about which a hypotenuse member 5 is swingable. This hypotenuse member supports a sighting glass or telescope 6 which has a line of sight aligned with the lower or inner edge of the member 5. A second slider 10 of dovetailed construction is also movable along the groove 2 and is provided with an upstanding spacer 11, which has a corner normally contacting hypotenuse 5 and an opposite face engaging the edge face of strip 18 of an adjustable angle assembly. The thickness of the spacer, i. e. its vertical dimension as viewed in Fig. 3, may be accurately determined. This dimension of the spacer 11 determines the length of the shorter leg $a$ of the smallest triangle.

The frame 1 may be provided with a diagonal guideway 15 which is disposed at an angle of 45° to the guideway 2. A diagonal member 16 may be slidably mounted in the guideway 15 and may form part of the angle assembly which also includes the transverse strip 18 which, being fixed to the end of member 16, extends at an angle of 45° to the latter and at an angle of 90° to the guideway 10. The transverse strip 18 is fixed to member 16 in such a manner that it may slide over the board 1 and over the guideway 2 while the member 16 is sliding in guideway 15. As this movement occurs, the upper edge of strip 18 may engage the lower edge of spacer 11, while the lower edge of the hypotenuse member 5 slidably engages the corner of the spacer. The diagonal member 16 may define a line, for example extending along its lower edge, which intersects the inner edge of the hypotenuse 5 at a point of contact P between the angle assembly (including parts 16 and 18) and the hypotenuse 5. As the angle assembly is adjusted relative to the board, the member 16 slides in the guideway 15 and the transverse member 18 is moved to a new position always parallel to its previous position, such a position being indicated, for example by dot and dash lines in Fig. 3. The hypotenuse 5 with the slider 3 may then be moved along the guideway 2 so that the spacer 11 continues to contact the adjoining edges of the transverse member 18 and the hypotenuse 5.

A second sighting glass or telescope 26 is arranged to provide a line of sight extending at right angles to the guide 2 and through the point of intersection of the inner edge of that guide and the outer or lower edge of the diagonal member 16. Thus the line of sight provided by the sighting glass 26 coincides with the base of the large triangle.

It is thus evident that the portions of my range finder which have been described define parts of a geometrical figure such as that shown in Fig. 1. The parts of hypotenuse member 5 and strip 18 between the point P and the inner edge of guide 2 define the hypotenuse and longer leg respectively of the smallest triangle, while the portion of spacer 11 coinciding with the inner edge of the guide 2 defines the dimension $a$ of that triangle. Obviously the longer leg of this triangle forms one side $e$ of the theoretical square while the distance from this leg along the inner edge of guide 2 to the lower line of sight is also a side of the square. Since there is always a definite relation between the length of the side of a square and the length of its diagonal, the portion of the member 16 between the point P and the lower line of sight always has a definite mathematical relation to the length of the sides of the theoretical square and consequently to the size of the theoretical intermediate triangle. Accordingly, while the readings which are afforded by my range finder might be provided by a scale, for example, on the transverse member 18, I prefer to associate such a scale with the diagonal member 16 thus providing a larger scale to be provided with a range finder of given size. In practice the graduations of this scale can be accurately determined for any given setting of the instrument and size of the spacer 11. Accordingly the scale may be accurately manufactured and may be arranged to afford direct readings of the distance of the object being sighted.

In use a device of this character may be disposed either in a horizontal plane, for example, upon a tripod, or in a vertical plane, or in a position between a horizontal and a vertical plane. The device is adjusted so that the object being sighted may be seen through the glass 26. The angle assembly is then adjusted while the hypotenuse 5 is maintained in contact with the spacer 11 and the latter in turn is maintained in contact with the transverse member 18 while the outer end of the hypotenuse member is maintained continuously in contact with the angle assembly at the point P. The parts being maintained in this relative position are adjusted until the object may also be sighted through the glass 6. Thereupon the scale on diagonal member 16 affords a direct reading to indicate the distance of the sighted object. To facilitate such a reading the frame may be provided with an arrow A having its point juxtaposed to the point of intersection of the line of sight of the glass 26 and the projection of the inner edge of guide 2.

A mirror 23 may be located adjoining this mark or arrow so that the reading may conveniently be seen when the user of the device has his eyes in the general vicinity of the glass 6, thus the line of sight from this mirror is indicated by the dotted arrow at the lower right hand corner of Fig. 3.

Fig. 6 illustrates an optional embodiment of the invention involving the general principles which have been described but being provided with stereoscopic telescopes and with associated mirrors to facilitate the proper adjustment of the device. As diagrammatically indicated in Figs. 7 and 8 the telescopes T may be located adjoining the corner of the theoretical square, a mirror 30 being associated with one telescope and a mirror 31 being associated with the other. These mirrors may be disposed on the shorter leg of the largest triangle and may be arranged so that their reflecting surfaces are in planes at an angle of 45° to this leg of the triangle and at right angles to each other. Accordingly one mirror is effective in reflecting an image from the right angle corner of the triangle into one of the telescopes T, while the other mirror may be similarly effective in reflecting an image from the point of intersection of the hypotenuse and shortest leg of the smallest triangle. A mirror 33 may be located at the 90° corner of the large triangle at an angle of 45° to the legs thereof so that this mirror is effective in reflecting an image of the object which is received along the lower line of sight, this image being reflected to the mirror 33 and by the same to the mirror 31 and being reflected by the latter into the corresponding telescope T. An adjustable mirror 34, the detailed mounting of which will be described, is arranged at the upper angle of the large triangle to reflect an image received along the upper line of sight to the mirror 30 which in turn reflects the image into corresponding telescope T.

The range finder shown in Fig. 6 may be provided with frame 1ª having a guide 2ª corresponding to the guide 2 of Fig. 1 and a diagonal guideway 15ª corresponding to the guideway 15 of Fig. 1; an angle assembly comprising a diagonal member 16ª and a transverse member 18ª may be arranged in the general manner already described. The hypotenuse member 5ª is arranged to contact the corner P of the angle assembly in the manner which has been described and has its inner end mounted upon a pivot assembly carried by a slider 40, the slider 40 in effect performing the function of both sliders 3 and 10 of Fig. 4.

A pintle member 41 is pivoted in the slider 40 but has a semi-cylindrical portion cut away in the plane of the transverse strip 18ª. The hypotenuse member is fixed to the remaining semi-cylindrical portion of the pintle member. Upon the slabbed-off face of the pintle member which is thus provided, a small semi-cylindrical spacer is arranged to contact the adjoining edge of the transverse strip 18ª. This member may conveniently comprise an accurately calibrated wire 44 one-half of which projects beyond the slabbed-off surface of this pintle member as particularly illustrated in Fig. 14. It will be understood that the pintle member has a small concentric bore in which the wire 44 is accurately disposed. Thus in effect the spacer is provided by the semi-cylindrical portion of the wire which projects beyond the slabbed-off surface of the pintle and the radius of this wire affords the critical dimension of the small triangle corresponding to the leg a of the triangle shown in Fig. 1. Above its slabbed-off portion the pintle supports a cup 47 which may conveniently be of frusto-conical form and which receives a block 48 of corresponding form resting therein. The mirror 34 which may conveniently be formed of metal has a reflecting face coinciding with the axis of the pintle pin and is mounted upon the block 48. A bar 55 extends from the block 48 and is disposed with its longitudinal axis at right angles to the plane of the reflecting surface of mirror 34.

Links 60 and 61 of equal length are pivotally connected to the slider 40 and to the hypotenuse 10ª, the adjoining ends of these links having pivotal connections with ears extending from a collar 63 slidable along the bar 55. In this embodiment of the invention the end of the large triangle and the corresponding side of the square is defined by a theoretical line intermediate the edges of the guide 2ª and extending through the axis of the pintle pin 40. Accordingly the spacer 44 is always located directly on this line and the mirrors 30, 31, 33 and 34 are also located on this line. The pivotal connection for the outer end of link 60 is disposed midway between the sides of the slider 40 as shown in Fig. 9 so that its axis is disposed on this line, i. e. on the theoretical line corresponding to the end of the large triangle, while the axis of the corresponding pivotal connection of link 61 is intersected by the lower edge of the hypotenuse 5ª, the axes of these pivotal connections being equidistant from the axis of the pintle 40. Accordingly the links 60 and 61 which are of equal length are effective in positioning the member 55 so that it always extends symmetrically along the bisector of the angle between the end of the large triangle and the hypotenuse. Thus, as the angular position of the hypotenuse relative to the guideway 2ª is changed, the mirror 34 is automatically positioned so that it may receive light rays from an object aligned with the inner edge of the hypotenuse and reflect such rays along the end of the large triangle to the mirrors 30. Accordingly the mirror 34 is automatically adjusted to insure the proper reflection of images visible along the edge of the hypotenuse so that such images may be seen through one of the telescopes.

When the hypotenuse is properly adjusted in the general manner which has been described with reference to Fig. 1, so that the object being sighted might be seen by sighting along a line corresponding to the inner edge of the hypotenuse as well as along a line corresponding to the base of the large triangle, such an image will be reflected by the mirror 34 as well as by the mirror 33 so that the images will be seen through the two telescopes T. When the images as viewed through the two telescopes by the two eyes of the observer exactly coincide, the object is being properly sighted. Thereupon the reading afforded by the diagonal member 16ª may be observed to determine the distance of the sighted object. Since the mirror 33 is located substantially at the 90° corner of the theoretical large triangle, I prefer to offset the scale on diagonal member 16ª longitudinally of the member. To facilitate a reading of the scale a mirror 23ª may be arranged as shown in Fig. 13, a suitable fixed glass 65 extending over the corresponding part of the diagonal scale and being provided with a convenient hair line which may be observed either directly or through the mirror 23ª. If desired, the glass 65 may be arranged to magnify the readings on the scale. Obviously the scale is offset toward the outer end of the member 16ª a distance corresponding to the distance of the hair line from the corner of the theoretical triangle.

It may be observed that the graduations of the scales provided by the present invention are not spaced at uniform distances from each other but that the graduations are disposed closer together nearer the outer end of the scale, i. e. the device is arranged so that more accurate readings can be afforded for shorter distances while relatively smaller adjustments are necessary when readings from greater distances are being obtained.

In order to permit the use of a device or range finder such as shown in Fig. 6 by users having different interpupillary dimensions, one of the telescopes T may be adjustably mounted as particularly shown in Fig. 12. Such a telescope is mounted on a sliding block 70 which is movable in the guideway or groove 71 having its sides parallel to the guide 2ª. The block 70 is provided with an upstanding lug 72 pivotally connected to the end of an adjusting screw 73 which is in threaded engagement with bracket 74 fixed to the frame 1ª. Thus the screw 73 may be adjusted to cause the glasses T to be disposed nearer or farther away from each other to suit the interpupillary characteristics of the user of the instrument.

It is evident that, when an instrument of the character shown in Fig. 6 is being used, the device is adjusted until the object being sighted can be seen through the telescope T which receives the image from the mirror 33. The angular assembly and the slider 40 with the mirror 34 and hypotenuse 5ª are then adjusted until the object can also be seen through the other telescope. The adjustment is continued until the images exactly coincide whereupon the parts are in their proper position to permit an accurate reading to be taken directly from the scale 16ª or by means of the mirror 23ª if desired. It is evident that while the parts are being adjusted the spacer 44 is maintained in contact with the edge of the transverse strip 18ª so that the parts are maintained in their proper geometrical relationship.

The present invention affords range finders which are simple in principle and which require only a simple adjustment in order to permit a direct reading of the distance of the sighted object, thus special tables or necessity of troublesome complications is avoided. Furthermore a range finder of this type may have its scale accurately calibrated when made, since no computation to suit the range finder to a particular location is necessary. While the scale might be arranged along one of the sides of the theoretical square as on the transverse member 18 or along the guideway 2 more accurate readings are permitted by associating the scale with the diagonal member and guideway due to the greater dimensions of these portions of the device.

If desired, suitable mechanical means may be provided to permit the nicer adjustment of the angle assembly and hypotenuse and yieldable connections may be provided between the hypotenuse and transverse member to assure the engagement of the spacer with these parts under a constant or uniform pressure.

I claim:

1. Range finder comprising a frame, a swinging hypotenuse member, a rectilinear guide on said frame, an element sliding on the guide and providing a pivotal connection for the hypotenuse member, an angle assembly including a strip extending at right angles to said guide and a diagonal element extending at an acute angle from said strip, a spacer disposed between the strip and hypotenuse member in the region of the guide, said assembly having a point of contact with the edge of the hypotenuse member, so that the spacer and said strip cooperate with a portion of the hypotenuse member in defining a right triangle, said diagonal element being slidable along a guideway in the frame so that the angular position of the hypotenuse member relative to the strip and guide may be varied, and means to facilitate sighting along the hypotenuse and along a base line extending at right angles to the guide, whereby both lines of sight may converge upon a common distant object when the angle assembly is adjusted by sliding the diagonal element along the guideway to bring the hypotenuse to the proper angle, and a scale associated with said diagonal element giving a reading of the distance of the sighted object.

2. Range finder comprising a frame, a swinging hypotenuse member, a rectilinear guide on said frame, an element sliding on the guide and providing a pivotal connection for the hypotenuse member, an angle assembly including a strip extending at right angles to said guide and a diagonal element extending at an acute angle from said strip, a spacer disposed between the strip and hypotenuse member in the region of the guide, said assembly having a point of contact with the edge of the hypotenuse member, so that the spacer and said strip cooperate with a portion of the hypotenuse member in defining a right triangle, said diagonal element being slidable along a guideway in the frame so that the angular position of the hypotenuse member relative to the strip and guide may be varied, and a pair of sighting glasses aligned respectively with the hypotenuse member and with a base line extending at right angles to said rectilinear guide, whereby the lines of sight defined by the respective glasses may be caused to converge upon a common distant object when the angle assembly is adjusted by sliding the diagonal element along the guideway to bring the hypotenuse to the proper angle, and a scale associated with said assembly and giving a reading of the distance of the sighted object.

3. Range finder comprising a frame, a swinging hypotenuse member, a rectilinear guide on said frame, an element sliding on the guide and providing a pivotal connection for the hypotenuse member, an angle assembly including a strip extending at right angles to said guide and a diagonal element extending at an acute angle from said strip, a spacer disposed between the strip and hypotenuse member in the region of the guide, said assembly having a point of contact with the edge of the hypotenuse member, so that the spacer and said strip cooperate with a portion of the hypotenuse member in defining a right triangle, said diagonal element being slidable along a guideway in the frame so that the angular position of the hypotenuse member relative to the strip and guide may be varied, and means to facilitate sighting along the hypotenuse and along a base line extending at right angles to the guide, whereby both lines of sight may converge upon a common distant object when the angle assembly is adjusted by sliding the diagonal element along the guideway to bring the hypotenuse to the proper angle, said angle assembly cooperating with a part of the frame to afford a reading depending upon the position of the angle assembly relative to the frame and consequently indicating the distance of the sighted object.

4. Range finder comprising a frame, a swinging hypotenuse member, a rectilinear guide on said frame, an element sliding on the guide and providing a pivotal connection for the hypotenuse member, an angle assembly including a strip extending at right angles to said guide and a diagonal element extending at an acute angle from said strip, a spacer disposed between the strip and hypotenuse member in the region of the guide, said assembly having a point of contact with the edge of the hypotenuse member, so that the spacer and said strip cooperate with a portion of the hypotenuse member in defining a right triangle, said diagonal element being slidable along a guideway in the frame so that the angular position of the hypotenuse member relative to the strip and guide may be varied, and means to facilitate sighting along the hypotenuse and along a base line extending at right angles to the guide, whereby both lines of sight may converge upon a common distant object when the angle assembly is adjusted by sliding the diagonal element along the guideway to bring the hypotenuse to the proper angle, said angle assembly cooperating with a part of the frame to afford a reading depending upon the position of the diagonal member in the guideway and consequently indicating the distance of the sighted object, and a mirror arranged to reflect the reading thus given transversely of the diagonal member.

5. Range finder comprising a frame, a swinging hypotenuse member, a rectilinear guide on said frame, an element sliding on the guide and providing a pivotal connection for the hypotenuse member, an angle assembly including a strip extending at right angles to said guide and a diagonal element extending at an acute angle from said strip, a spacer disposed between the strip and hypotenuse member in the region of the guide, said assembly having a point of contact with the edge of the hypotenuse member, so that the spacer and said strip cooperate with a portion of the hypotenuse member in defining a right triangle, said diagonal element being slidable along a guideway in the frame so that the angular position of the hypotenuse member relative to the strip and guide may be varied, and means to facilitate sighting along the hypotenuse and along a base line extending at right angles to the guide, whereby both lines of sight may converge upon a common distant object when the angle assembly is adjusted by sliding the diagonal element along the guideway to bring the hypotenuse to the proper angle, said angle assembly cooperating with a part of the frame to afford a reading depending upon the position of the diagonal member in the guideway and consequently indicating the distance of the sighted object, and magnifying means arranged clearly to afford an enlarged image of said reading.

6. Range finder comprising a frame, a swinging hypotenuse member, a rectilinear guide on said frame, an element sliding on the guide and providing a pivotal connection for the hypotenuse member, an angle assembly including a strip extending at right angles to said guide and a diagonal element extending at an acute angle from said strip, a spacer disposed between the strip and hypotenuse member in the region of the guide, said assembly having a point of contact with the edge of the hypotenuse member, so that the spacer and said strip cooperate with a portion of the hypotenuse member in defining a right triangle, said diagonal element being slidable along a guideway in the frame, so that the angular position of the hypotenuse member relative to the strip and guide may be varied and the point of contact with the hypotenuse member may also be varied, and means to facilitate sighting along the hypotenuse and along a base line extending at right angles to the guide, whereby both lines of sight may converge upon a common distant object when the angle assembly is adjusted by sliding the diagonal element along the guideway to bring the hypotenuse to the proper angle, and a scale upon said angle assembly giving a reading of the distance of the sighted object.

7. Range finder comprising a frame, a swinging hypotenuse member, a rectilinear guide on said frame, an element sliding on the guide and providing a pivotal connection for the hypotenuse member, an angle assembly including a strip extending at right angles to said guide and a diagonal element extending at an acute angle from said strip, a spacer disposed between the strip and hypotenuse member in the region of the guide, said assembly having a point of contact with the edge of the hypotenuse member, so that the spacer and said strip cooperate with a portion of the hypotenuse member in defining a right triangle, said diagonal element being slidable along a guideway in the frame so that the angular position of the hypotenuse member relative to the strip and guide may be varied and the point of contact with the hypotenuse member may also be varied, stereoscopic telescopes and cooperating reflecting means to receive images received along lines of sight aligned with said hypotenuse member and with a base line extending at right angles to said rectilinear guide, so that the images viewed through the telescopes may be caused to coincide when the angle assembly is adjusted by sliding the diagonal element along the guideway to bring the hypotenuse to the proper angle, and a scale associated with said assembly element to give a reading of the distance of the sighted object.

8. The subject matter of the preceding claim further characterized in that said reflecting means includes a mirror arranged to receive images along the hypotenuse, and mechanism automatically to adjust said mirror as the angular position of the hypotenuse is varied.

9. Range finder comprising relatively movable members defining lines of sight converging on a distant object being sighted, mirrors arranged on the lines of sight to receive images of such an object, one of said mirrors being swingable about an axis perpendicular to the plane including the lines of sight in response to the relative movement of said members, and a pair of fixed mirrors to receive images reflected from said first-named mirrors, a pair of normally fixed stereoscopic telescopes into which the images are reflected respectively by the mirrors of said pair, and a scale associated with said relatively movable members to indicate the distance of the object being sighted, whereby, when the members are properly positioned the images seen through the telescopes exactly coincide, and the distance of the object can then be directly read from the scale.

10. Range finder comprising a frame providing a rectilinear guide, a swinging hypotenuse member, an element slidable along the guide and providing an axis about which the hypotenuse member swings, a slidable assembly having a point of contact with said hypotenuse member, said assembly being slidable so that the point of contact moves along a line at an angle of 45° to said guide, a spacer disposed between the assembly and hypotenuse and normally defining the leg of a small triangle, means defining a line of sight along the edge of the hypotenuse member adjoining said spacer, means defining a line of sight along a base line at right angles to the guide and extending through the point of intersection of said line at 45° to said guide and the extension of the side of the small triangle defined by the spacer, and a scale associated with the slidable assembly and frame to afford an indication of the distance of a common distant object viewed along each of said lines of sight.

BARRETT R. WELLINGTON.